(12) United States Patent
Harbour et al.

(10) Patent No.: US 10,776,795 B2
(45) Date of Patent: Sep. 15, 2020

(54) DATA AMELIORATION AND REFORMATION SYSTEM

(71) Applicant: American Express Travel Related Services Company, Inc., New York, NY (US)

(72) Inventors: Amy L. Harbour, Huntington, WV (US); Michael A. Woods, Cypress, TX (US); Jane E. Cook, Mountain Lakes, NJ (US); Michael Alexander Gonzales, Fulshear, TX (US); Sachin Jadhav, Phoenix, AZ (US); Yogaraj Jeyaprakasam, Phoenix, AZ (US); Deepak Narayanan, Peoria, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 503 days.

(21) Appl. No.: 15/429,997

(22) Filed: Feb. 10, 2017

(65) Prior Publication Data
US 2018/0232730 A1    Aug. 16, 2018

(51) Int. Cl.
*G06Q 30/02*    (2012.01)
(52) U.S. Cl.
CPC ................ *G06Q 30/0201* (2013.01)

(58) Field of Classification Search
None
See application file for complete search history.

(56) References Cited

U.S. PATENT DOCUMENTS

| | | | |
|---|---|---|---|
| 2012/0010934 A1* | 1/2012 | Walker | G06Q 30/02 705/14.17 |
| 2014/0164234 A1* | 6/2014 | Coffman | G06Q 20/14 705/40 |

* cited by examiner

*Primary Examiner* — Joseph W. King
*Assistant Examiner* — Amit Patel
(74) *Attorney, Agent, or Firm* — Thomas Horstemeyer, LLP

(57) ABSTRACT

The systems may include receiving, by a processor, transaction information for a transaction, wherein the transaction information comprises a transaction amount; matching, by the processor, the transaction information with a transaction type; retrieving, by the processor, a plurality of possible charge types associated with the transaction type; comparing, by the processor, the transaction information with the plurality of possible charge types; separating, by the processor, the transaction amount of the transaction information into at least one individual charge amount; and/or identifying, by the processor, a charge type of the plurality of possible charge types associated with the at least one individual charge amount.

20 Claims, 4 Drawing Sheets

DATA AMELIORATION AND REFORMATION SYSTEM

FIELD

The present disclosure generally relates to data amelioration and reformation.

BACKGROUND

Various transactions (e.g., purchasing a travel ticket, renting a car or hotel, etc.) may have a primary charge associated with the price of the purchase or rental, and one or more ancillary charges which the consumer must pay to complete the transaction. Records of charge for such transactions may show the total amount for the transaction, but may not show the specific amounts of any ancillary charges.

SUMMARY

A system, method, and article of manufacture (collectively, "the system") are disclosed relating to data amelioration and reformation. In various embodiments, the system may be configured to perform operations including receiving, by a processor, transaction information for a transaction, wherein the transaction information comprises a transaction amount; matching, by the processor, the transaction information with a transaction type; retrieving, by the processor, a plurality of possible charge types associated with the transaction type; comparing, by the processor, the transaction information with the plurality of possible charge types; identifying, by the processor, at least one individual charge amount comprised in the transaction amount; and/or separating, by the processor, the transaction amount into the at least one individual charge amount. In various embodiments, the method may further comprise collecting, by the processor, market information from a data source. The data source may be at least one of a global distribution system, a business travel account associated with a merchant or consumer, a transaction history associated with a consumer profile, a transaction history associated with a merchant profile, or a purchase policy associated with a consumer or merchant. In various embodiments, the method may further comprise matching and enriching, by the processor, the market information to create enhanced market information, wherein the plurality of possible charge types comes from the enhanced market information.

In various embodiments, the plurality of possible charge types may be associated with at least one of a consumer or a merchant. The transaction amount comprises a primary charge and an ancillary charge. The separating the transaction amount into the at least one individual charge amount may comprise separating the transaction amount into the primary charge and the ancillary charge. The identifying the charge type associated with the at least one individual charge amount may comprise identifying the primary charge and the ancillary charge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
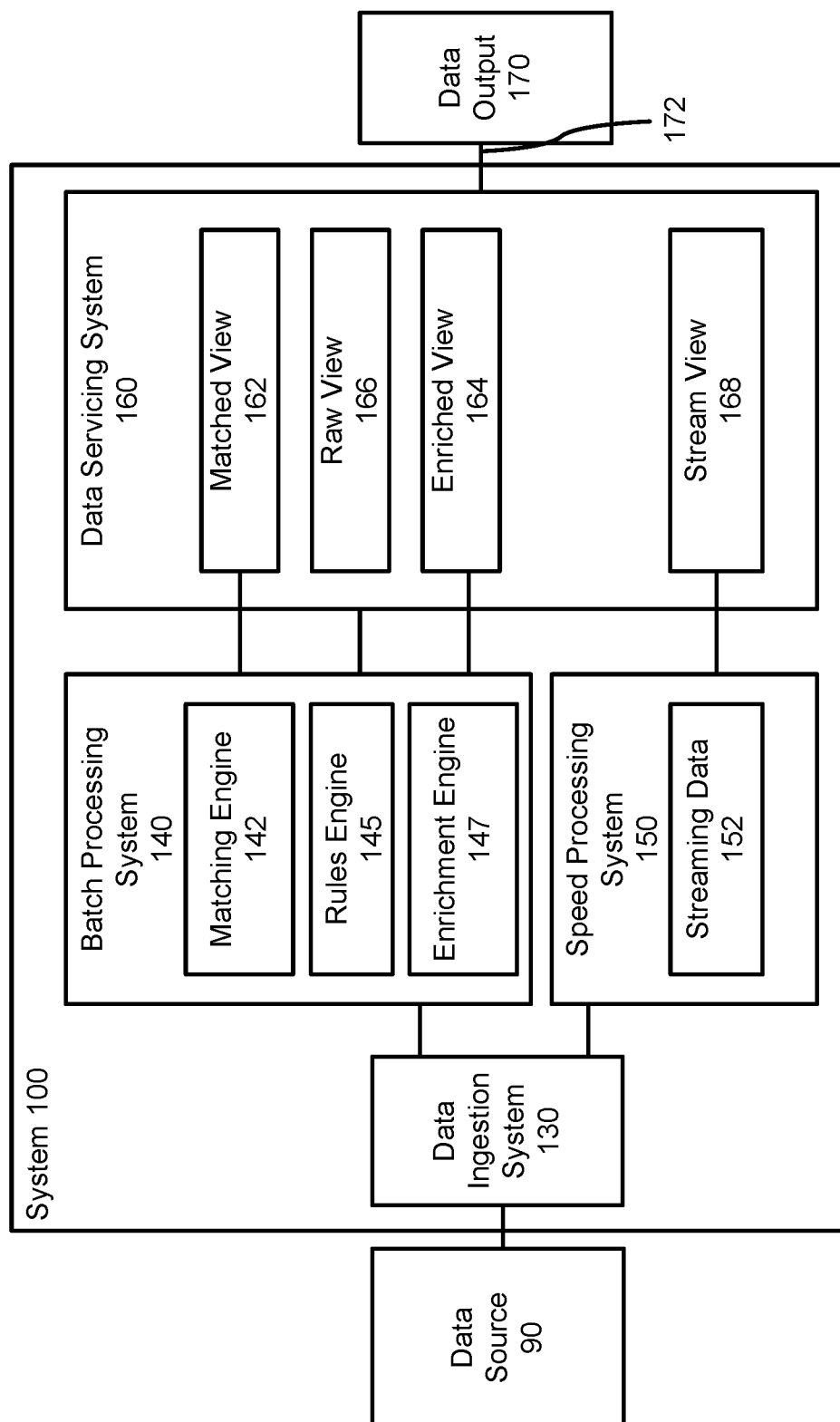
FIG. 1 shows a system for data amelioration and reformation, in accordance with various embodiments.

With reference to FIG. 1, an exemplary system 100 for data amelioration and reformation is disclosed, in accordance with various embodiments. System 100, in operation, may have the capability to break down a transaction amount into any and all individual, distinct charges comprised in the transaction amount. For example, a consumer may rent a car, which has a primary charge associated with the price of the rental, and additional charges (e.g., fees or costs) associated with the rental. The transaction amount is the total of the primary charge plus any additional charges. Examples of additional charges may be collision damage coverage, extra driver fee, taxes, etc. System 100 may separate the transaction amount into individual charge amounts (i.e., the primary charge and each additional charge), and identify the individual charge amounts. Therefore, system 100 may be used to report transactions to parties, such as merchants, that monitor on what their employees spend company money. For example, employees of a merchant may not be authorized to buy collision damage coverage when renting a vehicle for company purposes. System 100 may break down the rental car transaction amount into individually identified charges, allowing the employer, merchant, employee, or others to see what charges were incurred, and which will be reimbursed to the employee. As another example, system 100 may also aid cost monitoring in transaction negotiations between parties, in which the parties may agree that certain individual charges will not be incurred by a party.

In various embodiments, system 100 may comprise a data ingestion system 130, a batch processing system 140, a speed processing system 150, and/or a data servicing system 160. All or any subset of components of system 100 may be in communication with one another via a network. System 100 may be computer-based, and may comprise a processor, a tangible non-transitory computer-readable memory, and/or a network interface. Instructions stored on the tangible non-transitory memory may allow system 100 to perform various functions, as described herein.

In various embodiments, system 100 may receive the data to be processed by a data source 90. Data source 90 may be any system associated with an individual and/or entity which provides data about the individual and/or entity. For example, data source 90 may be a merchant's global distribution system, a business travel account, travel records including airfare, rental vehicles, hotels, etc., human resources policies, line item details, accounts receivable, transaction histories and/or behavior associated with consumers and/or merchants, purchase policies associated with a consumer and/or merchant, and/or the like. The data provided by data source 90 may relate to how an individual or entity conducts transactions and/or business (e.g., what prices they charge/pay, what fees or costs are associated with certain goods/services, the dates of transactions, etc.). For example, the data provided by data source 90 may be transaction information for various transactions, wherein the transaction information for a transaction may comprise a set of information such as the price, date, product or service, location, merchant information (e.g., a merchant identifier), and/or the like. Overall, the data provided by data source 90 may be referred to as market information, which may include charge information (e.g., prices of goods and services ("primary charges"), and other charges associated with primary charges ("ancillary charges")), purchase and/or transaction histories and trends, etc. In various embodiments, data source 90 may transmit data to system 100 for processing.

In various embodiments, data ingestion system 130 may comprise hardware and/or software capable of storing data and/or analyzing information. Data ingestion system 130 may comprise a server appliance running a suitable server operating system (e.g., MICROSOFT INTERNET INFORMATION SERVICES or, "IIS") and having database software (e.g., ORACLE) installed thereon. Data ingestion system 130 may be in electronic communication with data source 90, and may receive market information from data source 90. In various embodiments, the data received from data source 90 by data ingestion system 130 may be raw data, so data ingestion system 130 may prepare the raw data for further processing by system 100. In various embodiments data ingestion system 130 may tabulate the raw data and/or validate the raw data received from data source 90 (e.g., confirm whether the date of a transaction data point is correct, and/or the like). In various embodiments, data ingestion system 130 may assign a key to each piece of data received from data source 90. The key may be a unique number, timestamp, source identifier, and/or the like, and may be used to identify each respective piece of data.

In various embodiments, batch processing system 140 may comprise hardware and/or software capable of storing data and/or analyzing information. Batch processing system 140 may comprise a server appliance running a suitable server operating system (e.g., MICROSOFT INTERNET INFORMATION SERVICES or, "IIS") and having database software (e.g., ORACLE) installed thereon. Batch processing system 140 may be in electronic communication with data ingestion system 130, and may receive the prepared data from data ingestion system 130. In various embodiments, batch processing system 140 may comprise a rules engine 145, which provides the processing or matching rules and/or parameters for a matching engine 142 and/or an enrichment engine 147 comprised in batch processing system 140. Rules engine 145 may instruct matching engine 142 to identify attributes of the prepared data and match the prepared data with stored data (e.g., stored transaction information) having like attributes. Stored data may be transaction information or data collected by system 100 and/or provided by a third party. For example, the attributes of prepared data associated with a plane ticket will be different than the attributes of prepared data associated with a hotel rental. Therefore, based on the matching rules from rules engine 145, matching engine 142 may match data associated with plane tickets with like plane ticket data from the stored data, and match data associated with hotel rentals with like hotel rental data from the stored data. The stored transaction information may be enhanced and/or enriched by system 100 by matching like stored data based on processing and matching rules from rules engine 145 and enriching the stored data.

Figure 2A:
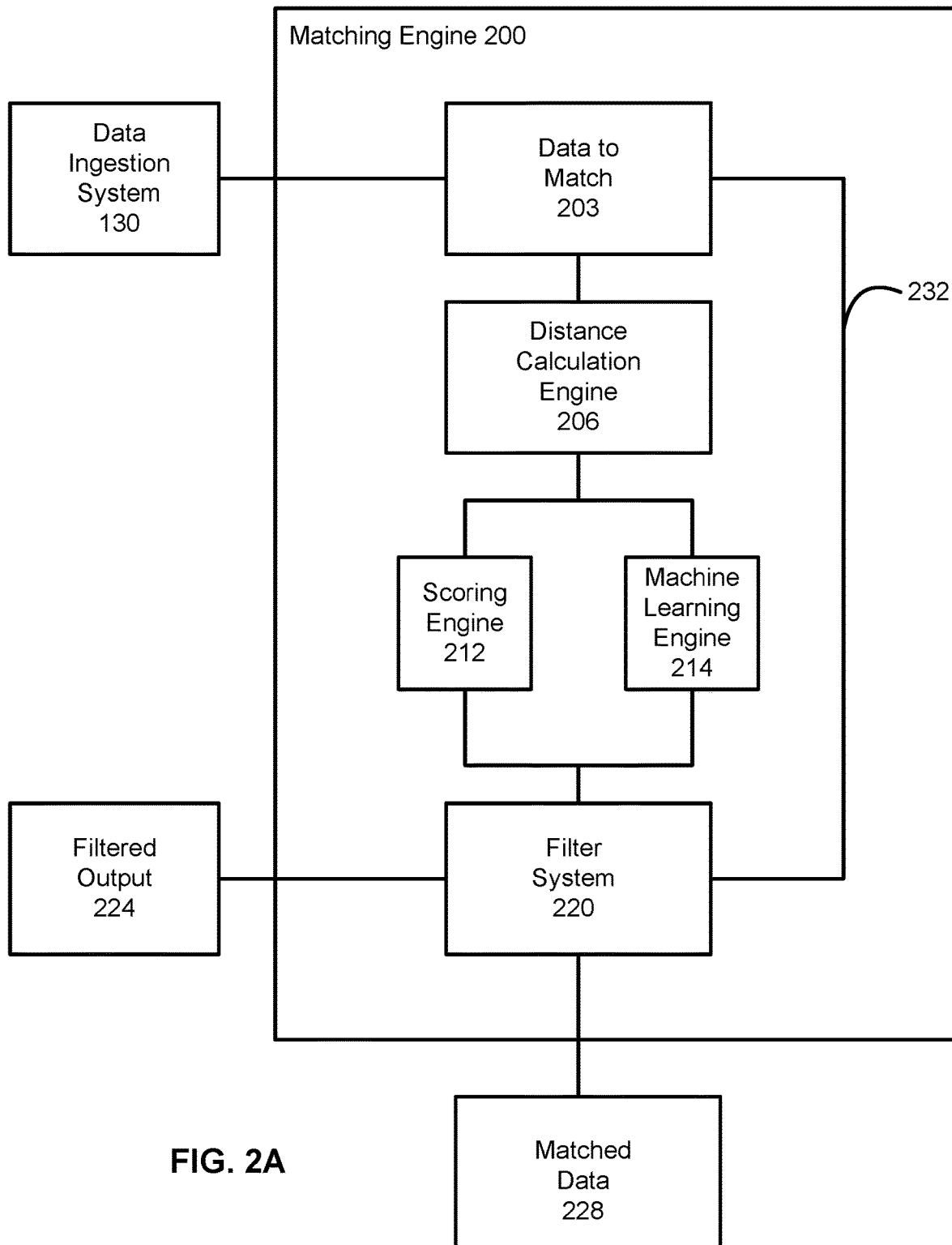
FIG. 2A shows an exemplary matching engine, in accordance with various embodiments.

With reference to FIG. 2A, a matching engine 200 (an example of matching engine 142 in FIG. 1) is depicted, in accordance with various embodiments. Matching engine 200 may comprise hardware and/or software capable of storing data and/or analyzing information. Matching engine 200 may receive data to match 203 from data ingestion system 130. Data to match 203 may be from a data source 90 (e.g., accounts receivable), and may be compared to, and/or matched with, stored transaction information gathered by system 100 and/or provided by a third party. Matching engine 200 may calculate the distance and/or difference between data to match 203, or the distance and/or difference between data to match 203 and stored transaction information, via distance calculation engine 206. Data to match 203 may comprise various information (e.g., transaction information for various transactions), such as consumer names, dates of transactions, monetary values, or the like. Distance calculation engine 206 may comprise settings which instruct distance calculation engine 206 how to process data to match 203 in determining the distance/difference between data. Distance calculation engine 206, for example, may calculate normalized distance strings, distance numeric, and/or distance date/time of data to match 203. For example, distance calculation engine 206 may calculate the distance between two dates, which may have any date-related unit of measure (e.g., years, days, hours, or the like) (e.g., the distance between 2016 Feb. 3 and 2016 Feb. 4 is one day). As another example, the difference between numeric data simply may be a number (e.g., a difference value between dollar amounts). As another example, string distance may be measured by any suitable string distance algorithms such as optimal string alignment, q-gram, cosine similarity, hamming, jaro-winkler, levenshtein, or the like. The result of a string distance calculation may be a value between zero and 1, wherein a result of 1 may be a perfect match. For example, the strings "John Doe" and "Doe Joohn" may have a calculated distance of 0.67. In various embodiments, any data to match 203 that was separated for processing (e.g., the date and monetary amount separated from transaction information) may be rejoined by distance calculation engine 206 by a key assigned to the data.

In various embodiments, data to match 203 may continue to be processed in matching engine 200 by being analyzed by a scoring engine 212 and/or a machine learning engine 214. Scoring engine 212 may assign a matching score to data depending on how close the data is to matching other data of the same type or a Boolean type data. The matching score assigned by scoring engine 212 may be a score between zero and 1, for example, wherein a matching score of 1 between matched data indicates an exact match. A matching score may be assigned to each piece of data, or to a set of data, such as a set of transaction information (e.g., price, date, product or service, location, a merchant identifier, etc.). In various embodiments, a piece of data may be given a weight, which indicates its importance in analyzing it in comparison to or combined with other data. The weight of a piece of data may be the maximum matching score that piece of data may receive from scoring engine 212 based on its matching. Going along with the previous examples, a data set may comprise the dates, numeric, and strings discussed above. The strings having a matching score of 0.67, may have a weight of 0.2 (the maximum score the string may achieve from scoring engine 212 is 0.2). Therefore, of the matching score of the entire data set between zero and 1, the strings having a score of 0.67 may contribute 0.134 to the overall matching score (0.67 of the 0.2 possible maximum). The matching scores assigned to the dates and numeric may be summed with the matching score of the strings to achieve the overall score assigned to the data. In total, the data set (sum of all scores of individual pieces of data in the data set) may have a maximum matching score of 1.

Data to match 203 may also be processed through machine learning engine 214. Machine learning engine 214 may analyze the data and data quality. If the data is of low quality and/or low matching scores assigned by scoring engine 212, machine learning engine 214 may detect such quality and/or matching scores. In response, machine learning engine 214 may adjust the matching rules provided by rules engine 145 (in FIG. 1) to matching engine 200 in order for the data analysis and matching process to produce higher quality matching results. For example, machine learning engine 214 may detect a change in the transaction behavior of a consumer or merchant, which is causing the data quality or data matching scores provided by scoring engine 212 to decrease. Based on the change in transaction behavior (e.g., consumers using service A rather than service B, which was previously more common), machine learning engine 214 may adjust the matching rules provided to matching engine 200 to reflect such updated transaction habits, and therefore, matching engine 200 may produce higher quality data and matching.

Figure 2B:
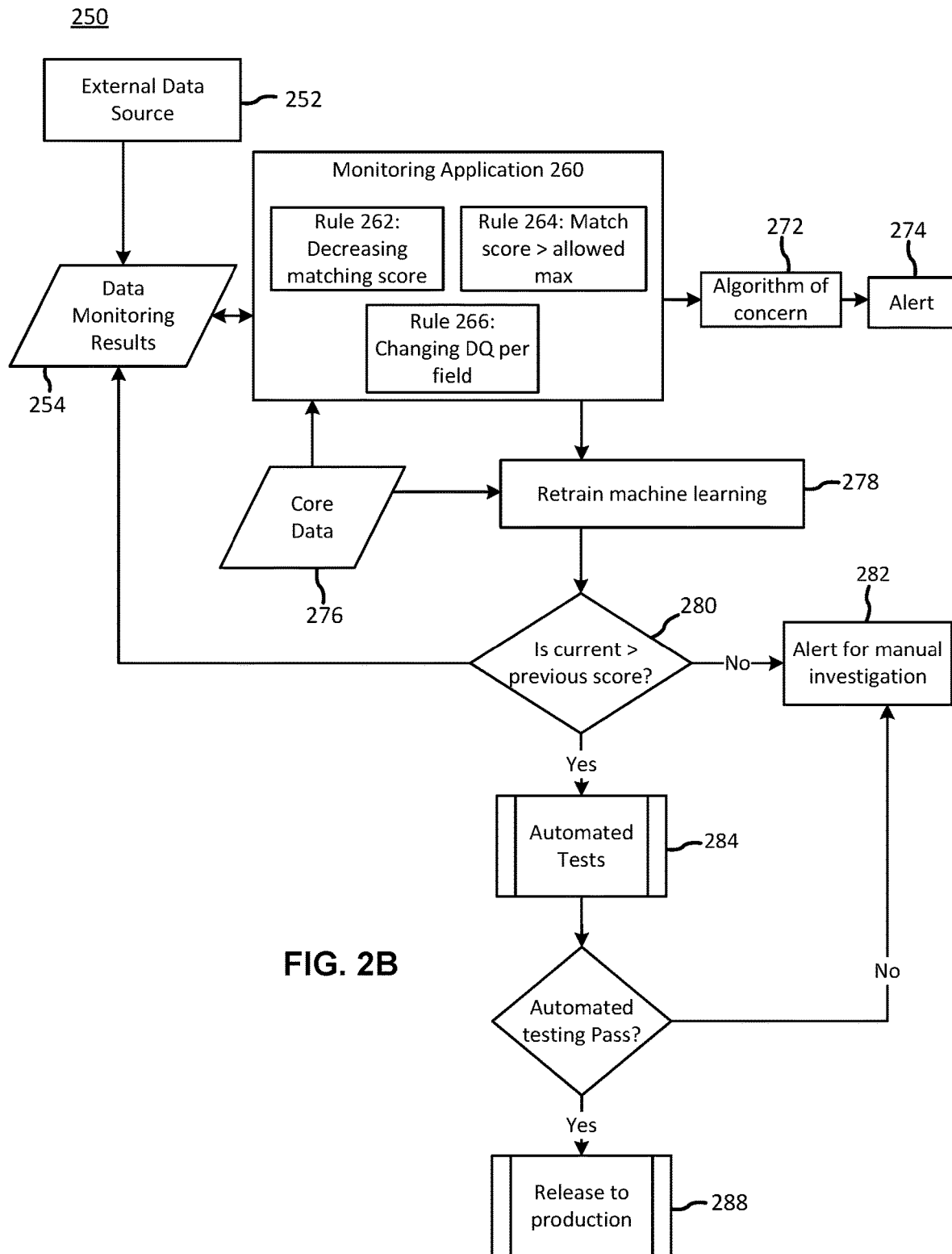
FIG. 2B shows an exemplary monitoring system, in accordance with various embodiments.

With reference to FIGS. 1, 2A, and 2B, system 100 and/or machine learning engine 214 may comprise a monitoring system 250 configured to monitor the data quality/matching scores of matched data and adjust the matching rules provided to matching engine 200 in response to low data quality/matching scores. Monitoring system 250 may comprise an external data source 252 which may provide external data such as mobile data, disputed data, or the like (i.e., any desired field of data). As an example, monitoring system 250 may retrieve disputed data (i.e., data or information that a customer has disputed because of an inaccuracy, incompleteness, and/or the like) from external data source 252 to analyze the data quality of the disputed data. The data may be passed between data monitoring results 254 and a monitoring application 260. Monitoring application 260 may comprise various monitoring rules 262-266 which, if met, may trigger an alert indicating that the matching rules provided by rules engine 145 may need to be adjusted. For example, monitoring rules may comprise monitoring rule 262: a decreasing matching score (i.e., the data being analyzed by matching engine 200 is not being adequately matched and/or receiving poor matching scores from scoring engine 212), monitoring rule 264: a matching score greater than an allowed maximum matching score (a matching score too high may indicate a problem with the matching rules), and/or rule monitoring 266: a changing data quality ("DQ") per field. Monitoring application 260 may comprise any additional or alternative monitoring rules. Continuing with the example above, in which monitoring system 250 retrieved disputed data from external data source 252, the disputed data may be sent to monitoring application 260 to determine if the disputed data meets any of monitoring rules 262-266.

In response to the disputed data meeting at least one of the monitoring rules 262-266 in monitoring application 260 (for example, disputed data may have a decreasing matching score, meeting monitoring rule 262), monitoring system 250 may identify the algorithm of concern 272 (i.e., the matching rule of concern) and create an alert 274 to an operator advising of the algorithm of concern 272. In various embodiments, in response to at least one of monitoring rules 262-266 being met, monitoring system 250 may automatically retrain machine learning (block 278), which may comprise adjusting the matching rules provided to matching engine 142 (e.g., matching engine 200) by rules engine 145. To do so, core data 276 may be extracted (core data 276 may be provided by a data source 90), labeled to indicate a desired characteristic, and input into machine learning engine 214. The labeled data may be core data 276 labeled as having the desired characteristic which monitoring system 250 will retrain machine learning engine 214 to recognize. Therefore, as machine learning engine 214 receives the labeled data, machine learning engine is retrained to recognize the characteristic labeled on the labeled data (i.e., machine learning engine 214 is told that data A has characteristic B, for example), with the goal being that machine learning engine 214 will be able to recognize the same characteristic in data that is not labeled as having the characteristic.

In response to retraining machine learning (block 278), machine learning engine 214 may have adjusted the matching rules based on the retraining. Therefore, matching engine 200 may match data implementing the adjusted matching rules, and the matched data is assigned a matching score by scoring engine 212. Monitoring system 250 may determine if the current matching score is greater than (i.e., improved from) the previous matching score (block 280) (i.e., the matching score before the retraining). If "no," monitoring system 250 may send an alert for manual investigation 282 because automatic retraining of machine learning (block 278) may not provide adequate adjustment of the matching rules for matching engine 200. If the answer to block 280 is "yes," monitoring system 250 may monitor matching engine 200 by performing automated tests 284 to make sure matching engine 200 is matching data and producing matching scores between a desired minimum and maximum matching score. In response to matching engine 200 failing automated tests 284, an alert for manual investigation 282 may be sent to an operator. In response to matching engine 200 passing automated tests 284, the adjusted matching rules through the retraining of machine learning engine 214 may be released to production 288 to analyze/match incoming data in system 100. Data in monitoring system 250 may be constantly or periodically sent back as data monitoring results 254 for possible further monitoring.

In various embodiments, returning to FIG. 2A, data to match 203 may be filtered through filter system 220. Filter system 220 may be set to select and keep all results, the top ten (or any desired number) highest scored results, or any other category of data. The selected data filtered through filter system 220 may be filtered output 224. In various embodiments, unmatched data 232 may be filtered via filter system 220 and sent to the beginning of matching engine 200 to join the next data to match 203, which may be analyzed with the updated rules adjusted by machine learning engine 214 via monitoring system 250 (in FIG. 2B). Filter system 220, in response, may provide matched data 228 as output of matching engine 200.

In various embodiments, with reference to FIG. 1, data received by batch processing system 140 from data ingestion system 130 may be processed through enrichment engine 147 in addition to, or instead of, through matching engine 142. Enrichment engine 147 may enrich the data received from data ingestion system 130 based on rules provided by rules engine 145. For example, enrichment engine 147 may correct typographical errors in the data, or simplify the data to show only characteristics of interest (e.g., transaction type, date, time, location, and/or the like). In various embodiments, various data sources 90 may have a quality rating associated with each of them (i.e., the data from one data source may be of a higher quality or reliability than another data source). For example, a first data source may have a lower quality rating than a second data source. In various embodiments, rules engine 145 may provide rules to enrichment engine 147 instructing enrichment engine 147 to use the highest quality data possible. As an example of how enrichment engine 147 may work, system 100 may receive data from the first data source, and subsequently receive data from the second data source. The first data source and second data source may provide various overlapping data (i.e., data of the same type). Accordingly, in response to system 100 receiving data from the second data source, enrichment engine 147 may enrich the data by replacing data from the first data source that is overlapped by the second data source, because the second data source provides higher quality data.

In various embodiments, with reference to FIGS. 1 and 2A, filtered output 224 and/or matched data 228 from matching engine 200 may be transmitted to data servicing system 160 as a matched view 162 of the data processed through batch processing system 140. The enriched data output from enrichment engine 147 may be transmitted to data servicing system 160 as an enriched view 164 of the data processed through batch processing system 140. In various embodiments, raw data (i.e., data not analyzed or processed by matching engine 142 and/or enrichment engine 147) may be transmitted by batch processing system 140 to data servicing system 160 as a raw view 166 of the data.

In various embodiments, with continued reference to FIG. 1, the data from data ingestion system 130 may be transmitted to speed processing system 150. Speed processing system 150 may process and/or analyze the data from data ingestion system 130 in the same or similar way as the engines provided in batch processing system 140, as discussed herein. However, speed processing system 150 may analyze and/or process streaming data 152 that may be real time, or near real time data (i.e., data received within five minutes of the analysis and processing). Therefore, between batch data processing runs by batch processing system 140, speed processing system 150 may analyze and process streaming data 152 (e.g., matching and enriching data in a similar way as completed by matching engine 142 and enrichment engine 147, as discussed herein). Speeding processing system 150 may transmit the analyzed and processed data to data servicing system 160 as a stream view 168, which may show data similar to matched view 162 and enriched view 164 from batch processing system 140. Stream view 168 may comprise analyzed data from speed processing system 150 that is available for viewing for a limited amount of time (e.g., five minutes, or any desired duration) to show the viewer what current data is showing. Therefore, stream view 168 is continuously replacing older data with the most recent data.

In various embodiments, data servicing system 160 may store the analyzed and processed data from batch processing system 140 and speed processing system 150 until a user requests to view the data. A user of system 100 may request a certain type of data output 170 by making a query 172, such as requesting information and data related to a certain transaction or transaction type. Data output 170 may be any data available in data servicing system 160, so a user may request matched view 162 and/or enriched view 164, and use such data. A user may request raw view 166 of the data to act upon the data as the user desires, and/or the user may request stream view 168 to view the most recent data produced by system 100. Data output 170 may be sold to users, published for view, and/or the like.

In various embodiments, data output 170 of system 100 may be provided to a business department to analyze and manipulate data output 170 as seen fit, or to merchants, for example, for monitoring and processing of corporate transaction instruments for merchant employees (e.g., making sure employees are not incurring any unauthorized charges). In various embodiments, with combined reference to FIGS. 1 and 2A, data output 170 may be provided to consumers on a device (e.g., a mobile device, tablet, personal computer, desktop computer, laptop computer, etc.). Such consumers may be on-boarded into system 100 (i.e., the consumer has a consumer profile with system 100), such that system 100 may be able to detect transactions the consumer has made or is making, and see consumer transaction behavior. For example, system 100 may receive transaction information for a transaction by a consumer, and detect and match the transaction information with a transaction type (e.g., a plane ticket). Matching engine 142 may compare one or more pieces of data comprised in the transaction information to transaction type data stored in system 100, as described in relation to matching engine 200 herein. Matching engine 142 may identify the transaction type of the transaction information by matching the data in the transaction information with the transaction type (from the stored data collected by system 100 and/or received from a third party) that results in the best matching score (i.e., closest match). System 100 may detect that the consumer associated with the transaction type will be landing for the air travel in the afternoon on a certain day, and therefore, that day, system 100 may send as data output 170 to the consumer, an offer (e.g., for a taxi cab). System 100 may detect whether the consumer acted upon the offer (e.g., by using the offer for the taxi cab), or whether the consumer made use of another transportation service (e.g., a rideshare service) and ignored the offer. System 100 may detect what service the consumer used (e.g., a taxi or rideshare service) based on the merchant identifier identifying the merchant (which may identify a taxi or rideshare service, for example). System 100 may detect the consumer's response to the offer (e.g., accepting a taxi cab, or using a different service), and based on the consumer's response, machine learning engine 214 may adjust the rules for processing and analyzing data provided by rules engine 145 to matching engine 142 and/or enrichment engine 147. For example, additionally referring to FIG. 2B, one of the additional monitoring rules in monitoring application 260 may be a decreasing offer acceptance rate, which may trigger retraining the machine learning (block 278) to adjust the matching rules. Such an adjustment may reflect a change in transaction behavior (e.g., consumers prefer ride share services rather than taxi cabs) to produce higher quality data and matching.

Figure 3:
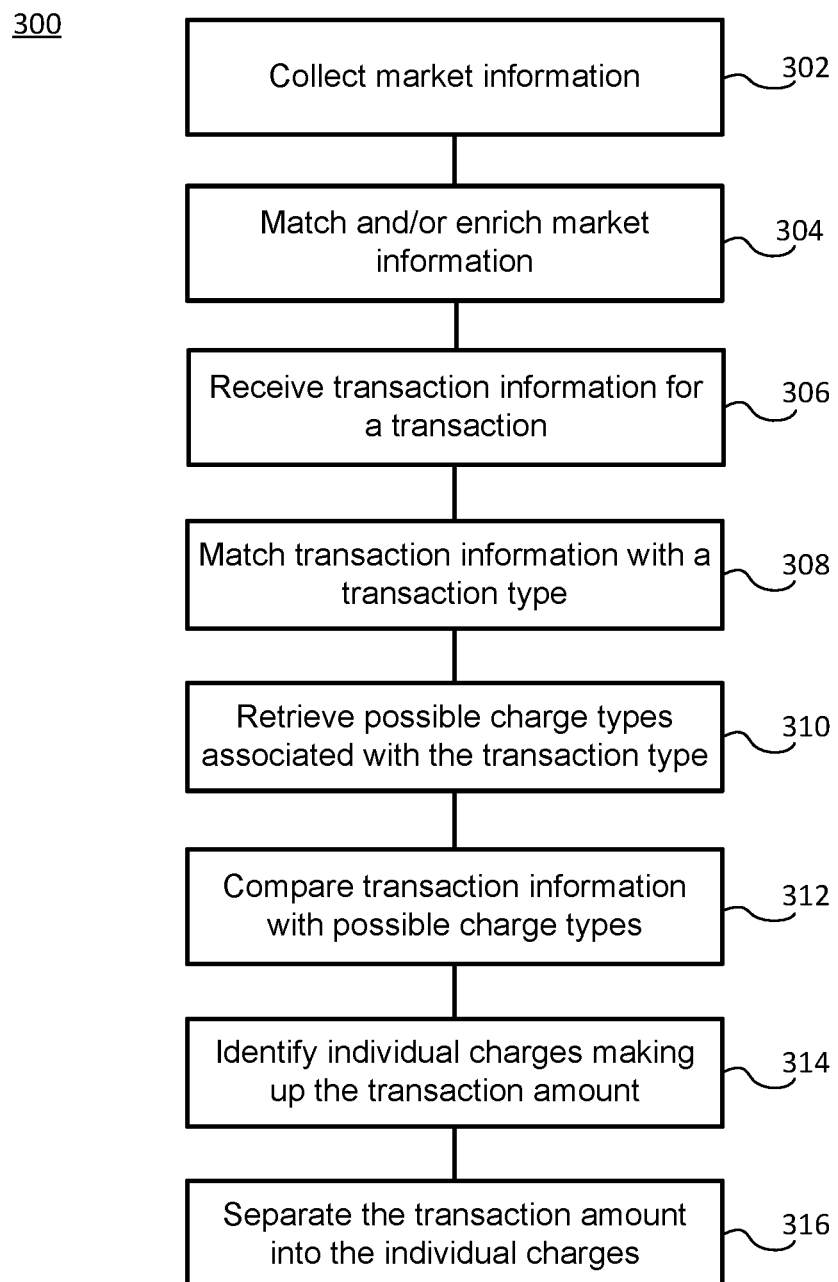
FIG. 3 shows a flowchart depicting an exemplary method for separating a transaction amount, in accordance with various embodiments.

With respect to FIG. 3, the process flow depicted is merely an embodiment of various embodiments, and is not intended to limit the scope of the disclosure. For example, the steps recited in any of the method or process descriptions may be executed in any order and are not limited to the order presented. It will be appreciated that the description herein makes appropriate references not only to the steps and consumer interface elements depicted in FIG. 3, but also to the various system components as described above with reference to FIGS. 1, 2A, and 2B.

As discussed herein, system 100 may be used to separate a transaction amount and identify individual charges (e.g., a primary charge and an ancillary charge(s)) making up the transaction amount. FIG. 3 depicts an exemplary method 300 for separating a transaction amount, in accordance with various embodiments. In various embodiments, with combined reference to FIGS. 1-3, system 100 may collect market information (step 302) from a data source 90. Data source 90 may be any source of market information, such as a merchant's global distribution system, a business travel account, travel records including airfare, rental vehicles, hotels, etc., human resources policies, line item details, accounts receivable, transaction histories and/or behavior associated with consumers and/or merchants, purchase policies associated with a consumer and/or merchant, and/or the like. As discussed herein, system 100 may match and/or enrich the market information (step 304) in any suitable manner, such as those described herein in association with matching engine 142 (e.g., matching engine 200) and/or enrichment engine 147, to produce enhanced market information. Matching engine 142, which receives matching rules from rules engine 145, may match data by detecting common attributes between data. In various embodiments, as described herein, matching engine 200 may calculate the distance and/or difference between data via distance calculation engine 206, and then score the matched data via scoring engine 212. System 100 may keep any data desired by filtering the data via filter system 220.

In various embodiments, system 100 may receive transaction information for a transaction (step 306). The transaction information may be provided by a data source 90, or from an account for a consumer and/or merchant set up with system 100. The transaction may comprise a transaction amount, which the user of system 100 and/or data output 170 may desire to separate into individual charges (e.g., a primary charge(s) and an ancillary charge(s)) and identify the individual charges. The transaction information may further comprise the date and time of the transaction, merchant information, consumer information, payment information, the goods or services purchased, and/or the like. The transaction information may be matched with a transaction type (step 308) associated with the transaction information by matching engine 200. The transaction information may be matched with the transaction type by comparing the transaction information to the matched and/or enhanced market information produced in step 304, and identifying a transaction type of the market information that matches the transaction information (e.g., the transaction information and the relevant market information may comprise the same or similar merchant information, transaction amount, good/service type, and/or the like). Matching engine 200 may compare the transaction information to the enhanced market information by calculating the difference and/or distance between the two, and identifying the transaction type based on the closest match between the transaction information and the matched market information, as described above in relation to matching engine 200.

In response to matching the transaction information with a transaction type, in various embodiments, system 100 may retrieve a possible charge type(s) associated with the transaction type (step 310). The possible charge types may be part of the market information that is associated with the transaction type. The possible charge types may be those types offered or included in the transaction type (e.g., insurance for a rental car). In various embodiments, the possible charge types may be associated with a consumer or a merchant, meaning that based on transaction behavior of the consumer or merchant, system 100 may be able to predict that the consumer and/or merchant will likely incur or charge the possible charge types during a transaction. Possible charge types associated with a transaction type may be the primary charge, and then any additional fees, upgrades, taxes, or additions associated with the primary charge (i.e., ancillary charges) associated with a transaction.

In various embodiments, system 100 may compare the transaction information with the possible charge types (step 312) associated with the transaction type. Matching engine 200 may, as described herein, calculate the distance and/or difference between the transaction information and the possible charge types to match parts of the transaction information with one or more possible charge types. For example, system 100 may be looking for the good/service purchased and an associated primary charge, merchant information to identify what types of ancillary charges may be present, the transaction behavior of the consumer associated with the transaction information, the date/time of the transaction to determine what amounts may be associated with which charges, and/or the like. Matching engine 200 may match one or more possible charge types with the transaction amount based on the comparison between the transaction information and the possible charge types. Based on the comparison, system 100 may identify individual charges making up the transaction amount (step 314). For example, by knowing the transaction type is a car rental, and the possible charge types are the rental price, taxes, insurance, damage payment, and/or the like, system 100 may be able to determine, based on the transaction amount and the amounts of the possible charge types, which possible charge types make up the transaction amount. In other words, matching engine 200 may calculate which combination of possible charge types is most similar to the transaction information including the transaction amount (i.e., having the best matching score). In response, system 100 may separate the transaction amount into the identified individual charges (step 316) so that a user of data output 170 may view each individual charge. Each individual charge may be a primary charge(s) and/or an ancillary charge(s).

The various components in system 100 may be independently, separately or collectively suitably coupled to each other, and/or network, via data links which include, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The disclosure and claims do not describe only a particular outcome of system 100, but the disclosure and claims include specific rules for implementing the outcome of system 100 and that render information into a specific format that is then used and applied to create the desired results of separating transaction amounts into identified individual charge amounts, as set forth in *McRO, Inc.* v. *Bandai Namco Games America Inc.* (Fed. Cir. case number 15-1080, Sep. 13, 2016). In other words, the outcome of system 100 can be performed by many different types of rules and combinations of rules, and this disclosure includes various embodiments with specific rules. While the absence of complete preemption may not guarantee that a claim is eligible, the disclosure does not sufficiently preempt the field of data processing at all. The disclosure acts to narrow, confine, and otherwise tie down the disclosure so as not to cover the general abstract idea of just data processing. Significantly, other systems and methods exist for separating transaction amounts into identified individual charge amounts, so it would be inappropriate to assert that the claimed invention preempts the field or monopolizes the basic tools for the same. In other words, the disclosure will not prevent others from breaking down charges into subcharges, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information (e.g., in the display of data output 170) of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the interne.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a My SQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, Google-Pay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method, comprising:
receiving, by a processor, transaction information for a transaction, wherein the transaction information comprises a transaction amount comprising a primary charge amount and an ancillary charge amount;
determining, by the processor, a first distance between the transaction information and enhanced market information;
associating, by the processor and based on matching rules, the transaction information with a transaction type based on the first distance that is closest between the transaction information and the enhanced market information, wherein the enhanced market information having the first distance that is the closest includes the transaction type;
retrieving, by the processor and from the enhanced market information, a plurality of possible charge types associated with the transaction type;
comparing, by the processor, the transaction information with the plurality of possible charge types;
determining, by the processor, a second distance between the transaction information and the plurality of possible charge types;
determining, by the processor and based on the second distance, a charge type of the plurality of possible charge types in the transaction information;
identifying, by the processor, the ancillary charge amount in the transaction amount based upon the charge type and the transaction type;
separating, by the processor, the ancillary charge amount from the transaction amount; and
sending, by the processor, the ancillary charge and the transaction amount to a display of a data output configured to dynamically relocate obscured information of an underlying window by:
  displaying a first window containing the ancillary charge and the transaction amount within a graphical user interface;
  displaying a second window within the graphical user interface;
  constantly monitoring boundaries of the first window and the second window to detect an overlap condition where the second window overlaps the first window such that the ancillary charge and the transaction amount in the first window is obscured from a user's view;
  determining that the ancillary charge and the transaction amount would not be completely viewable if relocated to an unobstructed portion of the first window;
  calculating a first measure of the area of the first window and a second measure of the area of the unobstructed portion of the first window;
  calculating a scaling factor which is proportional to the difference between the first measure and the second measure;
  scaling the ancillary charge and the transaction amount based upon the scaling factor;
  automatically relocating the scaled ancillary charge and the scaled transaction amount to the unobscured portion of the first window in a second format during an overlap condition so that the entire scaled ancillary charge and scaled transaction amount is viewable by the user; and
  automatically returning the relocated scaled ancillary charge and scaled transaction amount to the first format within the first window when the overlap condition no longer exists.

2. The method of claim 1, further comprising collecting, by the processor, market information from a data source to create the enhanced market information, wherein the data source is at least one of a global distribution system, a business travel account associated with a merchant or consumer, a consumer transaction history associated with a consumer profile, a merchant transaction history associated with a merchant profile, or a purchase policy associated with the consumer or the merchant.

3. The method of claim 2, further comprising matching and enriching, by the processor, market information to create the enhanced market information.

4. The method of claim 1, wherein the plurality of possible charge types is associated with at least one of a consumer or a merchant.

5. The method of claim 1, further comprising scoring, by the processor, the enhanced market information based on the first distance between the transaction information and the enhanced market information.

6. The method of claim 1, further comprising adjusting, by the processor, the matching rules based on a change in transaction.

7. The method of claim 1, further comprising:
ranking, by the processor, data sources of market information by quality of data; replacing, by the processor, data in the data sources wherein the quality of data is of lower quality; and
using, by the processor, the data sources with the quality of data that is of higher quality.

8. An article of manufacture including a non-transitory, tangible computer readable storage medium having instructions stored thereon that, in response to execution by a processor, cause the processor to perform operations comprising:
receiving, by the processor, transaction information for a transaction, wherein the transaction information comprises a transaction amount comprising a primary charge amount and an ancillary charge amount;
determining, by the processor, a first distance between the transaction information and enhanced market information;
associating, by the processor and based on matching rules, the transaction information with a transaction type based on the first distance that is closest between the transaction information and the enhanced market information, wherein the enhanced market information having the first distance that is the closest includes the transaction type;
retrieving, by the processor and from the enhanced market information, a plurality of possible charge types associated with the transaction type;
comparing, by the processor, the transaction information with the plurality of possible charge types;
determining, by the processor, a second distance between the transaction information and the plurality of possible charge types;
determining, by the processor and based on the second distance, a charge type of the plurality of possible charge types in the transaction information;

identifying, by the processor, the ancillary charge amount in the transaction amount;

associating, by the processor, the ancillary charge amount with the charge type;

separating, by the processor, the ancillary charge amount from the transaction amount; and sending, by the processor, the ancillary charge and the transaction amount to a display of a data output configured to dynamically relocate obscured information of an underlying window by:

displaying a first window containing the ancillary charge and the transaction amount within a graphical user interface;

displaying a second window within the graphical user interface; constantly monitoring boundaries of the first window and the second window to detect an overlap condition where the second window overlaps the first window such that the ancillary charge and the transaction amount in the first window is obscured from a user's view;

determining that the ancillary charge and the transaction amount would not be completely viewable if relocated to an unobstructed portion of the first window;

calculating a first measure of the area of the first window and a second measure of the area of the unobstructed portion of the first window;

calculating a scaling factor which is proportional to the difference between the first measure and the second measure;

scaling the ancillary charge and the transaction amount based upon the scaling factor;

automatically relocating the scaled ancillary charge and the scaled transaction amount to the unobscured portion of the first window in a second format during an overlap condition so that the entire scaled ancillary charge and scaled transaction amount is viewable by the user; and automatically returning the relocated scaled ancillary charge and scaled transaction amount to the first format within the first window when the overlap condition no longer exists.

9. The article of claim 8, further comprising collecting, by the computer-based system, market information from a data source to create the enhanced market information, wherein the data source is at least one of a global distribution system, a business travel account associated with a merchant or consumer, a consumer transaction history associated with a consumer profile, a merchant transaction history associated with a merchant profile, or a purchase policy associated with the consumer or the merchant.

10. The article of claim 9, further comprising matching and enriching, by the processor, market information to create the enhanced market information.

11. The article of claim 8, wherein the plurality of possible charge types is associated with at least one of a consumer or a merchant.

12. The article of claim 8, further comprising scoring, by the processor, the enhanced market information based on the first distance between the transaction information and the enhanced market information.

13. The article of claim 8, further comprising adjusting, by the processor, the matching rules based on a change in transaction behavior.

14. The article of claim 8, further comprising:

ranking, by the processor, data sources of market information by quality of data; replacing, by the processor, data in the data sources wherein the quality of data is of lower quality; and using, by the processor, the data sources with the quality of data that is of higher quality.

15. A system comprising:

A processor: and a tangible, non-transitory memory configured to communicate with the processor, the tangible, non-transitory memory having instructions stored thereon that, in response to execution by the processor, cause the processor to perform operations comprising:

receiving, by the processor, transaction information for a transaction, wherein the transaction information comprises a transaction amount comprising a primary charge amount and an ancillary charge amount;

determining, by the processor, a first distance between the transaction information and enhanced market information;

associating, by the processor and based on matching rules, the transaction information with a transaction type based on the first distance that is closest between the transaction information and the enhanced market information, wherein the enhanced market information having the first distance that is the closest includes the transaction type;

retrieving, by the processor and from the enhanced market information, a plurality of possible charge types associated with the transaction type;

comparing, by the processor, the transaction information with the plurality of possible charge types;

determining, by the processor, a second distance between the transaction information and the plurality of possible charge types;

determining, by the processor and based on the second distance, a charge type of the plurality of possible charge types in the transaction information;

identifying, by the processor, the ancillary charge amount in the transaction amount;

associating, by the processor, the ancillary charge amount with the charge type;

separating, by the processor, the ancillary charge amount from the transaction amount; and sending, by the processor, the ancillary charge and the transaction amount to a display of a data output configured to dynamically relocate obscured information of an underlying window by:

displaying a first window containing the ancillary charge and the transaction amount within a graphical user interface;

displaying a second window within the graphical user interface;

constantly monitoring boundaries of the first window and the second window to detect an overlap condition where the second window overlaps the first window such that the ancillary charge and the transaction amount in the first window is obscured from a user's view;

determining that the ancillary charge and the transaction amount would not be completely viewable if relocated to an unobstructed portion of the first window;

calculating a first measure of the area of the first window and a second measure of the area of the unobstructed portion of the first window;

calculating a scaling factor which is proportional to the difference between the first measure and the second measure;

scaling the ancillary charge and the transaction amount based upon the scaling factor;

automatically relocating the scaled ancillary charge and the scaled transaction amount to the unobscured portion of the first window in a second format during an overlap condition so that the entire scaled ancillary charge and scaled transaction amount is viewable by the user; and automatically returning the relocated scaled ancillary charge and scaled transaction amount to the first format within the first window when the overlap condition no longer exists.

16. The system of claim 15, further comprising collecting, by the processor, market information from a data source to create the enhanced market information, wherein the data source is at least one of a global distribution system, a business travel account associated with a merchant or a consumer, a consumer transaction history associated with a consumer profile, a merchant transaction history associated with a merchant profile, or a purchase policy associated with the consumer or the merchant.

17. The system of claim 15, further comprising matching and enriching, by the processor, market information to create the enhanced market information.

18. The system of claim 15, wherein the plurality of possible charge types is associated with at least one of a consumer or a merchant.

19. The system of claim 15, further comprising adjusting, by the processor, the matching rules based on a change in transaction behavior.

20. The system of claim 15, further comprising:

ranking, by the processor, data sources of market information by quality of data; replacing, by the processor, data in the data sources wherein the quality of data is of lower quality; and using, by the processor, the data sources with the quality of data that is of higher quality.

\* \* \* \* \*